(12) United States Patent
Denise

(10) Patent No.: US 9,182,254 B2
(45) Date of Patent: Nov. 10, 2015

(54) INDICATING DEVICE

(76) Inventor: Sylvain Denise, Vaureal (FR)

( * ) Notice: Subject to any disclaimer, the term of this patent is extended or adjusted under 35 U.S.C. 154(b) by 361 days.

(21) Appl. No.: 13/638,359

(22) PCT Filed: Feb. 16, 2011

(86) PCT No.: PCT/EP2011/000747
§ 371 (c)(1),
(2), (4) Date: Dec. 3, 2012

(87) PCT Pub. No.: WO2011/134561
PCT Pub. Date: Nov. 3, 2011

(65) Prior Publication Data
US 2013/0092078 A1    Apr. 18, 2013

(30) Foreign Application Priority Data

Apr. 29, 2010  (DE) .......................... 10 2010 018 721
Oct. 18, 2010  (FR) ...................................... 10 04083

(51) Int. Cl.
*G01D 11/28*    (2006.01)
*B60K 35/00*    (2006.01)
(Continued)

(52) U.S. Cl.
CPC ............... *G01D 11/28* (2013.01); *B60K 35/00* (2013.01); *B60K 37/02* (2013.01); *G01D 13/26* (2013.01); *B60K 2350/203* (2013.01); *B60K 2350/408* (2013.01)

(58) Field of Classification Search
CPC . G01D 11/28; G01D 13/26; B60K 2350/203; B60K 2350/408; B60K 35/00; B60K 37/02

USPC .......... 116/286–288, 305, 334, DIG. 36, 296, 116/DIG. 37; 362/23.01, 23.16, 23.17, 362/23.19, 23.2, 23.21
See application file for complete search history.

(56) References Cited

U.S. PATENT DOCUMENTS

| 2,123,376 | A | * | 7/1938 | Moeger ........................ 73/866.3 |
| 2,286,737 | A | * | 6/1942 | Hills ............................. 116/62.3 |
| 2,885,994 | A |   | 5/1959 | Butera |

(Continued)

FOREIGN PATENT DOCUMENTS

| DE | 19737679 A1 | 3/1999 |
| FR | 2936600 A1  | 4/2010 |
| JP | 08-327411   | 12/1996 |

OTHER PUBLICATIONS

International Search Report for application No. PCT/EP2011/000747 mailed Jun. 24, 2011.

(Continued)

*Primary Examiner* — R. A. Smith
*Assistant Examiner* — Tania Courson
(74) *Attorney, Agent, or Firm* — Fletcher Yoder, P.C.

(57) ABSTRACT

The present invention relates to an indicating device, in particular for a motor vehicle, which comprises a dial, a first needle and a second needle, the first needle being rotated in front of the dial and about a rotational axis, the second needle being rotated behind the dial and about the rotational axis, the second needle comprising an end portion visible along the periphery of the dial, the end portion including at least one first marking element and one second marking element, the first marking element and the second marking element being separated along the circumference of the dial, the indicating device comprising a means of illuminating the end portion of the second needle.

10 Claims, 2 Drawing Sheets

Figure 1:
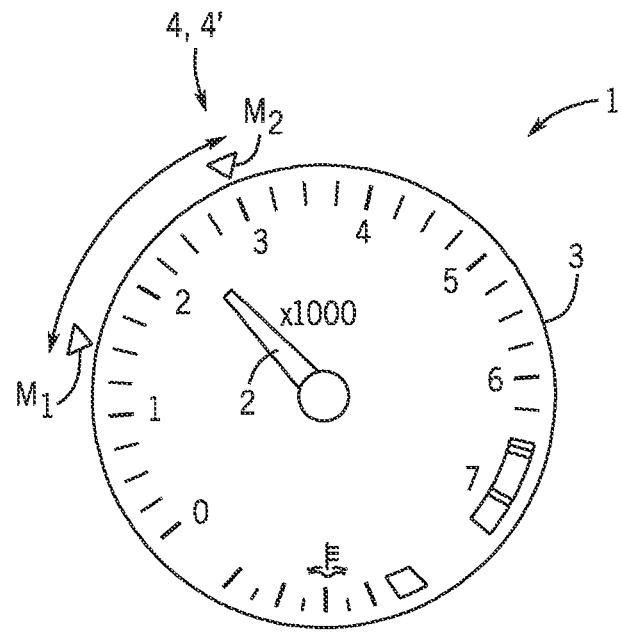

(51) Int. Cl.
*B60K 37/02* (2006.01)
*G01D 13/26* (2006.01)

(56) References Cited

U.S. PATENT DOCUMENTS

| | | | | |
|---|---|---|---|---|
| 5,631,448 | A * | 5/1997 | Rabinowitz et al. | 177/177 |
| 6,601,532 | B1 * | 8/2003 | Olbrich | 116/288 |
| 6,827,034 | B1 * | 12/2004 | Paulo | 116/286 |
| 7,178,479 | B1 * | 2/2007 | Richter | 116/288 |
| 7,305,932 | B2 * | 12/2007 | Hildebrand et al. | 116/301 |
| 7,506,607 | B2 * | 3/2009 | Takato | 116/301 |
| 7,810,445 | B2 * | 10/2010 | Krishnamurthy | 116/288 |
| 7,905,612 | B2 * | 3/2011 | Suess et al. | 362/23 |
| 2007/0252684 | A1 | 11/2007 | Fournier et al. | |
| 2008/0000410 | A1 * | 1/2008 | Mori et al. | 116/62.4 |

OTHER PUBLICATIONS

International Preliminary Report on Patentability mailed Oct. 30, 2012.
Japanese Office Action dated Jun. 17, 2014, and translation.
Chinese Office Action dated Mar. 26, 2015 and translation.

* cited by examiner

INDICATING DEVICE

CROSS REFERENCE TO RELATED APPLICATIONS

This application claims priority from and the benefit of PCT Application No. PCT/EP2011/000747, filed on Feb. 16, 2011; German Patent No. DE 10 2010 018 721.6, filed on Apr. 29, 2010; and French Patent No. FR 1004083, filed on Oct. 18, 2010; which are herein incorporated by reference.

BACKGROUND

The present invention relates to a needle indicator device such as those used in particular on board motor vehicles to display the speed or the engine speed of the vehicle or another parameter.

The dashboard of a motor vehicle generally comprises an instrument panel, situated facing the driver, which comprises a set of indicators, notably a speed indicator or a revolution counter or an indicator of other parameters of the vehicle, which may be needle-based.

The needle of the indicator, controlled and driven in rotation by a motor, or movement, generally extends in front of a screen-printed support bearing indication characters (graduations and speed values, in particular), forming the dial. The support of the indication characters is called front panel.

It has become commonplace to want to show, in addition to a first parameter (for example a speed of the vehicle or a speed of rotation of the combustion engine), also a second parameter, for example a reference speed, on the dial. The driver can thus read, on the same indicator, the first parameter and the second parameter. This reading has to be able to be done in the daytime and at night. Such an indicator is known from the American publication U.S. 2007/0252684 A1.

This indicator is not, however, capable of presenting additional information useful to the driver of the vehicle, for example the range of values of the speed of rotation of the engine for economical driving.

SUMMARY

The aim of the present invention is in particular to mitigate the drawbacks of the prior art, and in particular those cited above, and also to propose an indicator device which can be manufactured in a simple and efficient manner and at a comparatively low cost price.

According to the present invention, this aim is achieved by an indicator device, in particular for a motor vehicle, comprising a dial, a first needle, and a second needle, the first needle being driven in rotation in front of the dial and about an axis of rotation, the second needle being driven in rotation behind the dial and about the axis of rotation, the second needle comprising an end portion visible at the periphery of the dial, the end portion comprising at least one first marking element (M1) and one second marking element (M2), the first marking element (M1) and the second marking element (M2) being separated along the circumference of the dial, the indicator device comprising a means for illuminating the end portion (4') of the second needle.

Thus, it is advantageously possible to supply more information to the driver of the vehicle.

According to a preferred embodiment of the present invention, the end portion comprises only the first marking element (M1) and the second marking element (M2).

Through such an embodiment of the indicator device, it is advantageously possible to supply additional information to the driver without the attention of the driver being unnecessarily drawn by the additional information.

According to another preferred embodiment of the present invention, the end portion comprises the first marking element (M1), the second marking element (M2) and the peripheral part linking the first marking element (M1) and the second marking element (M2).

Through such an embodiment of the indicator device, it is advantageously possible to supply additional information to the driver directly and intuitively.

According to yet another preferred embodiment of the present invention, the first marking element (M1) and the second marking element (M2) are separated along the circumference of the dial between 20° and 70° relative to the axis of rotation, preferably between 30° and 60°. It is even more preferable for the first marking element (M1) and the second marking element (M2) to be separated along the circumference of the dial between 40° and 50°.

According to yet another preferred embodiment of the present invention, the means for illuminating the end portion is positioned in a fixed manner relative to the second needle.

According to yet another preferred embodiment of the present invention, the second needle (4) comprises a light guide.

According to yet another preferred embodiment of the present invention, the means for illuminating the end portion is positioned at the end portion.

Through such an embodiment of the indicator device, it is advantageously possible to illuminate the second needle in a simple and effective manner.

According to yet another preferred embodiment of the present invention, the illuminating means releases a light of different color dependent on the position about the axis of rotation of the second needle or dependent on the position about the axis of rotation of the first and second needles.

Through such an embodiment of the indicator device, it is advantageously possible to signal different situations to the driver of the vehicle.

Other features and advantages of the invention will emerge from reading the following description of a particular non-limiting embodiment of the invention.

DRAWINGS

Figure 4:
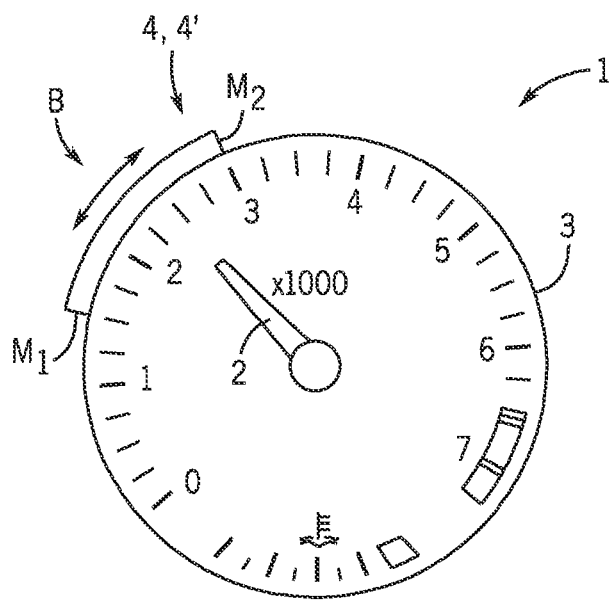
Figure 2:
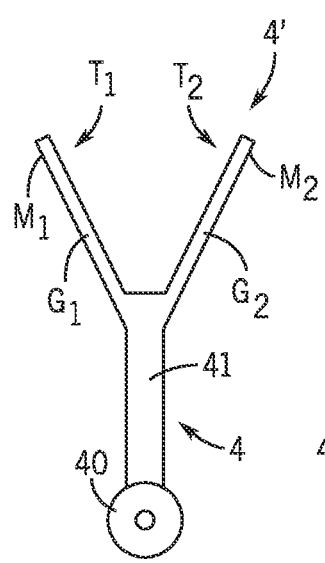
Figure 3:
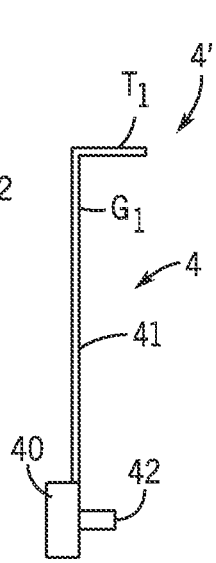
Figure 5:
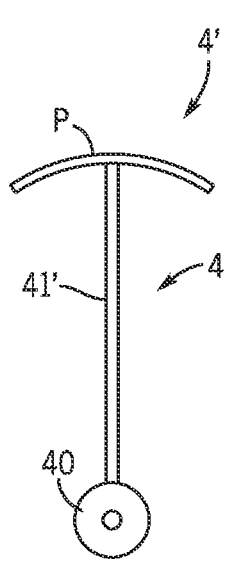
Figure 6:
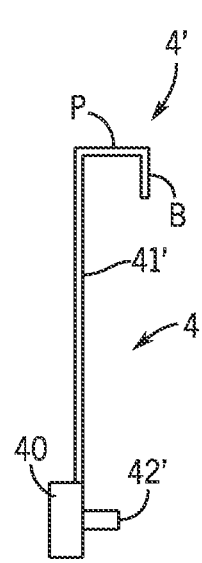

Reference will now be made to the appended drawings, in which:

FIG. 1 is a front schematic view of an indicator device comprising a first needle and a second needle according to a first embodiment of the present invention, FIG. 2 is a front schematic view of the second needle of the indicator device according to the first embodiment of the present invention, FIG. 3 is a side schematic view of the second needle of the indicator device according to the first embodiment of the present invention, FIG. 4 is a front schematic view of an indicator device comprising a first needle and a second needle according to a second embodiment of the present invention, FIG. 5 is a front schematic view of the second needle of the indicator device according to the second embodiment of the present invention, and FIG. 6 is a side schematic view of the second needle of the indicator device according to the second embodiment of the present invention.

DETAILED DESCRIPTION

The invention is described here in its application to an indicator device installed in a motor vehicle, combining, for example, the display of the instantaneous engine rotation speed and the display of a range of engine rotation speeds desired for economical driving.

In FIGS. 1 and 4, the indicator device is generally designated as 1 and comprises a support element, in particular in the form of a printed circuit board or a conductive plate (not designated by a reference symbol).

A dial, generally designated as 3, has, for example, a round or ring form and is positioned facing a user of the indicator device.

A first needle 2 is mounted in such a way in relation to the dial 3 that the first needle 3 can be turned rotationally about an axis of rotation (not designated by a reference symbol). The movement of the first needle 2 about the axis of rotation is generally driven using a motor (not designated by a reference symbol).

The parameter displayed by the first needle is, for example, the speed or the engine rotation speed of the vehicle.

An instantaneous minimum value of the parameter displayed and an instantaneous maximum value of the parameter displayed define a range of values of the parameter displayed along the dial 3 (or about the axis of rotation).

The range indicated by the instantaneous minimum and maximum values of the parameter displayed is, for example, defined according to the optimization criteria a) to d) mentioned below or according to a combination of these optimization criteria. The optimization criteria or the values of the optimization criteria can vary on the basis of events or effects external to the vehicle or on the basis of events or effects internal to the vehicle.
  a) Fuel or energy consumption; the range indicated by the instantaneous minimum and maximum values of the parameter displayed is defined, for example, using an economy program such that an engine of the vehicle (such as an internal combustion engine) is used in the most economical manner.
  b) Exhaust gas emissions; the range indicated by the instantaneous minimum and maximum values of the parameter displayed is defined, for example, using an ecology program such that an engine of the vehicle (such as an internal combustion engine) is used in such a way as to produce a minimum of exhaust gases.
  c) Safety; the range indicated by the instantaneous minimum and maximum values of the parameter displayed is defined, for example, using a safety program such that an engine of the vehicle (such as an internal combustion engine) is used in such a way as to supply the maximum torque suitable for a given road situation, notably in the case of a snow-covered road.
  d) Speed; the range indicated by the instantaneous minimum and maximum values of the parameter displayed is defined, for example, using a speed program such that an engine of the vehicle (such as an internal combustion engine) is used in such a way as to supply a maximum torque.

The range indicated by the instantaneous minimum and maximum values of the parameter displayed is signaled to the driver through a second needle 4. The second needle comprises an end portion 4' visible (to the driver) at the periphery of the dial 3. The end portion 4' comprising at least one first marking element M1 and one second marking element M2, the first marking element M1 and the second marking element M2 being separated along the circumference of the dial 3 and thus indicating the range of the instantaneous minimum and maximum values of the parameter displayed.

The second needle 4 is driven by a motor and via a control unit during the operation of the vehicle in such a way that the first marking element M1 indicates the minimum value and the second marking element M2 indicates the maximum value. It is thus possible, at each moment, for the information on the most economical range of the vehicle engine rotation speeds to be signaled to the driver.

It is possible for the second needle to be a needle of ring form.

FIGS. 1 to 3 show a first embodiment of the second needle 4 and FIGS. 4 to 6 show a second embodiment of the second needle 4.

The first embodiment of the second needle 4 comprises a basic element 40, comprising a round section. From the basic element 40 extends a first intermediate element 41. From the end of the first intermediate element 41, a first and a second bifurcation elements G1, G2 extend in such a way that the second needle according to the first embodiment has the form of a Y. At the opposite end of the first intermediate element 41, each bifurcation element G1, G2 comprises a support element T1, T2. A first support element T1 supports the first marking element M1 and the second support element T2 supports the second marking element M2. Preferably, each marking element M1, M2 forms a needle of bent type.

In FIG. 3, it can be seen that a first cylindrical element 42 extends from the basic element 40.

The second embodiment of the second needle 4 comprises the first and the second marking elements M1, M2 and an arc-shaped element B.

The second embodiment of the second needle 4 also comprises a basic element 40, comprising a round section. From the basic element 40 extends a second intermediate element 41'. A connector element P is positioned at the end of the second intermediate element 41'. The connector element P links the second intermediate element 41' to the arc-shaped element B. Preferably, the marking elements M1, M2 and the arc-shaped element B form a needle of bent type.

In FIG. 6, it can be seen that a second cylindrical element 42' extends from the basic element 40.

It is preferable, according to the present invention, for the marking elements M1, M2, and the arc-shaped element B, to comprise at least one illumination member or lighting means, notably in light-emitting diode (LED) form, which can emit light.

Preferably, the lighting means supplies light with a different color according to a predetermined code. For example, it is possible for the color "red" to indicate a value (of the first needle 2) outside the preferred range indicated by the second needle 4. Moreover, the color "green" could correspond to the situation that the value (of the first needle 2) lies within the preferred range indicated by the second needle 4.

It is also preferable for the marking elements M1, M2 to each comprise at least one LED or for the marking elements M1, M2 to each be at least one LED.

The invention claimed is:
1. An indicator device for a motor vehicle, comprising a dial, a first needle, and a second needle, the first needle being driven in rotation in front of the dial about an axis of rotation, the second needle being driven in rotation behind the dial about the axis of rotation, the second needle comprising an end portion, the end portion comprising a first marking element and a second marking element, the first marking element and the second marking element being separated along the circumference of the dial, the indicator device being configured to illuminate the end portion of the second needle;
  wherein the second needle comprises a basic element configured to rotate about the axis of rotation, and an intermediate element of the end portion extends radially outward from the basic element;

wherein the intermediate element forms a central part of a link that connects the first and second marking elements with the basic element, and the end portion comprises a peripheral part of the link;

wherein the peripheral part links the first marking element and the second marking element such that the first and second marking elements are separated from one another along the circumference of the dial;

wherein the intermediate element couples the basic element to the peripheral part without directly coupling to the first marking element or to the second marking element.

2. The indicator device as claimed in claim 1, wherein the first marking element and the second marking element are the only marking elements on the end portion.

3. The indicator device as claimed in claim 1, wherein the first marking element and the second marking element are separated along the circumference of the dial between 20° and 70° relative to the axis of rotation.

4. The indicator device as claimed in claim 1, wherein a device configured to illuminate the end portion is positioned in a fixed manner relative to the second needle.

5. The indicator device as claimed in claim 1, wherein the second needle comprises a light guide.

6. The indicator device as claimed in claim 1, wherein a device configured to illuminate the end portion is positioned at the end portion.

7. The indicator device as claimed in claim 1, wherein the indicator device is configured to release a light of different color dependent on the position about the axis of rotation of the second needle or dependent on the position about the axis of rotation of the first and second needles.

8. The indicator device as claimed in claim 1, wherein the first marking element and the second marking element are separated along the circumference of the dial between 30° and 60° relative to the axis of rotation.

9. The indicator device as claimed in claim 1, wherein the peripheral part of the end portion comprises a first bifurcation element coupling the first marking element to the intermediate element, and a second bifurcation element coupling the second marking element to the intermediate element.

10. The indicator device as claimed in claim 1, wherein the peripheral part of the end portion comprises a single connector element proximate to the circumference of the dial.

* * * * *